Patented Sept. 29, 1936

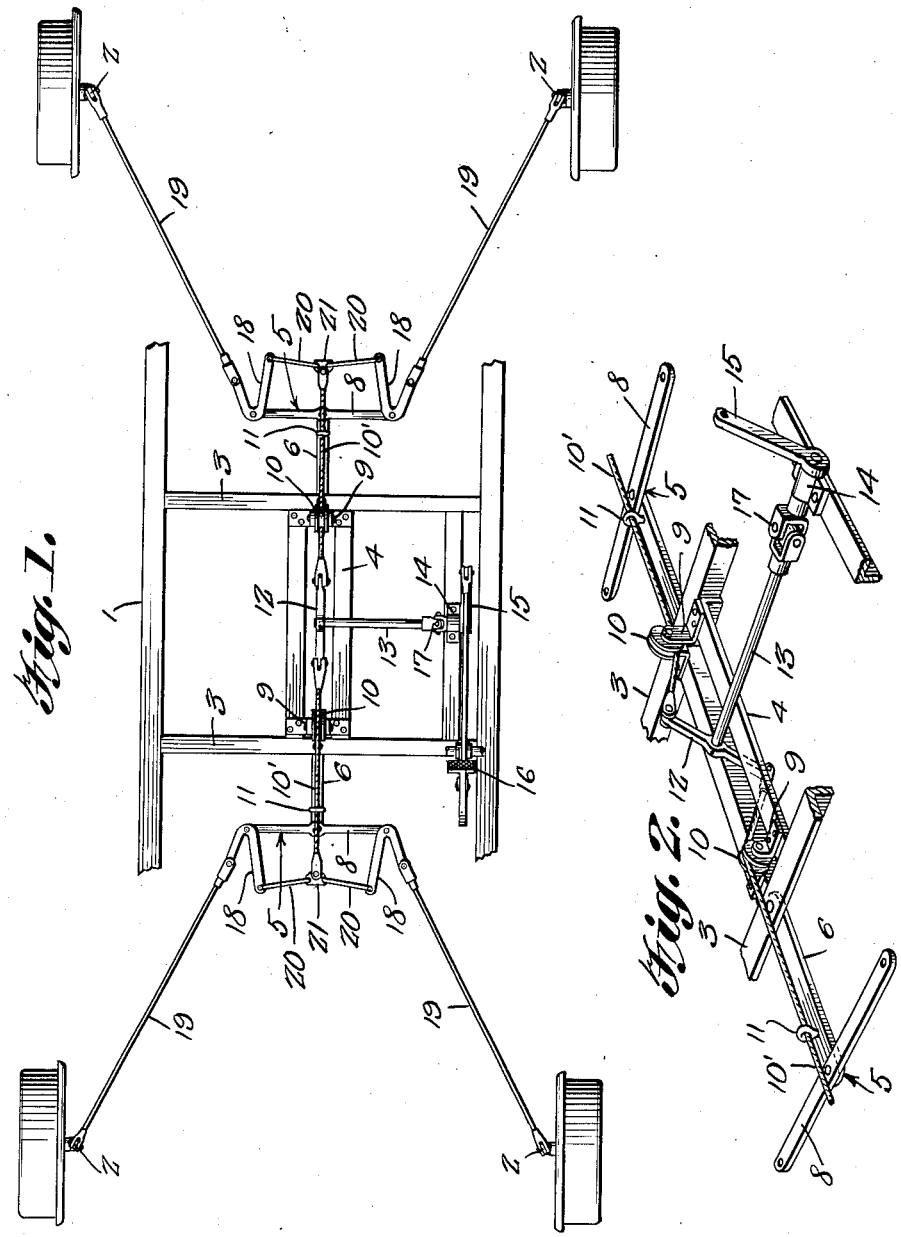

2,055,835

UNITED STATES PATENT OFFICE 2,055,835

BRAKE

Lawrence K. Bond, Miletus, W. Va.

Application February 11, 1936, Serial No. 63,414

4 Claims. (Cl. 188—204)

This invention relates to a brake rigging for motor vehicles and is especially adapted for efficiently operating four wheel brakes and has for the primary object the provision of a device of this character which may be readily adapted to a motor vehicle chassis and to the brake arms of the brakes and when actuated to apply the brakes will deliver an equal pull on each brake arm so that the brakes will have equal braking action to prevent skidding of the vehicle and permit the latter to be brought to a stop as rapidly as desired with maximum safety.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary plan view showing a brake rigging constructed in accordance with my invention and adapted to a motor vehicle chassis and to the brake arms of a four wheel brake.

Figure 2 is a fragmentary perspective view showing the brake rigging.

Referring in detail to the drawing, the numeral 1 indicates a fragmentary portion of a motor vehicle chassis and 2 the brake arms of four wheel brakes. The chassis 1 has transverse members 3 connected by a support 4. T-shaped supports 5 are pivoted to the transverse members and extend forwardly and rearwardly with respect to the chassis 1. Each T-shaped support includes a stem 6 and a head 8, the latter being pivotally connected to the stem. Brackets 9 are secured to the support 4 and have journaled thereto grooved pulleys 10 which are arranged in longitudinal alignment with the stems 6 of the supports 5. One of the grooved pulleys is in a plane slightly above the other. Flexible elements 10 engage with the pulleys and slide through guides 11 secured to the stems of the supports 5. One of the flexible elements passes under one of the pulleys while the other flexible element passes over the other pulley. The flexible elements extend forwardly and rearwardly with respect to the chassis and their adjacent ends are pivotally connected to the ends of an arm 12. The arm is secured to an operating shaft 13 journaled to the chassis, as shown at 14. An arm 15 is secured to the shaft 13 to which a brake operating medium 16 is connected. The shaft 13 includes sections connected by a universal joint 17 which permits the arm 12 to have a floating movement.

Bell crank levers 18 are pivoted to the ends of the heads 8 of the supports 5 and have pivoted thereto rods or similar elements 19 which are in turn pivoted to the arms 2 of the brakes. Links 20 are pivoted to the bell crank levers and to plates 21. The plates are pivoted to the flexible elements 10. A turning of the shaft 13 in one direction will cause a pull to be made on the brake arms to bring about the application of the brakes. Due to the arrangement of the bell crank levers, flexible elements 10 and shaft 13 an equal pull will be made on each arm of the brakes and consequently bring about an even application of all four brakes. A brake rigging of this character will compensate for variations in adjustments made in the several brakes so that each brake will be equally applied even should its adjustment vary from the other brakes. The supports 5 and shaft 13 have the floating action to assure an even pull to be placed on each brake arm during the operation of the brake operating medium 16 into brake applying position.

Having described the invention, I claim:

1. A brake rigging comprising supports pivotally mounted to a chassis, bell crank levers pivotally connected to said supports, means connecting the bell crank levers to brake arms of brakes, links pivoted to the bell crank levers, plates connecting the links in pairs, and an operating means connected to said plates.

2. A brake rigging comprising supports pivotally mounted to a chassis, bell crank levers pivotally connected to said supports, means connecting the bell crank levers to brake arms of brakes, links pivoted to the bell crank levers, plates connecting the links in pairs, flexible elements pivotally connected to the plates and extending in the direction of each other, guide means for the flexible elements, and an operating means connected to the flexible elements.

3. A brake rigging comprising supports pivotally mounted to a chassis, bell crank levers pivotally connected to said supports, means connecting the bell crank levers to brake arms of brakes, links pivoted to the bell crank levers, plates connecting the links in pairs, flexible elements pivotally connected to the plates and extending in the direction of each other, guide means for the flexible elements, an arm having its ends pivotally connected to the flexible elements, a journal shaft secured to said arm and including sections, a universal joint connecting said sections to permit the arm to have a floating action with the pivotally mounted supports, and an operating means connected to said shaft.

4. In combination with a motor vehicle chassis and four wheel brakes having arms, T-shaped supports pivoted to the chassis and extending in opposite directions and each including a stem and a head, pivots between the heads and the stems of the supports, bell crank levers pivoted to the ends of the heads, connecting rods pivoted to the bell crank levers and to the arms of the brakes, links pivotally connected to the bell crank levers, plates pivotally connected to the links, flexible elements pivotally connected to said plates, guides mounted to the stems and slidably receiving the flexible elements, rollers journaled to the chassis and engaged by the flexible elements, an arm connecting the flexible elements, a shaft journaled to the chassis and secured to the last-named arm and including sections, a universal joint connecting the sections, and an operating means connected to the shaft.

LAWRENCE K. BOND.